Patented Oct. 18, 1927.

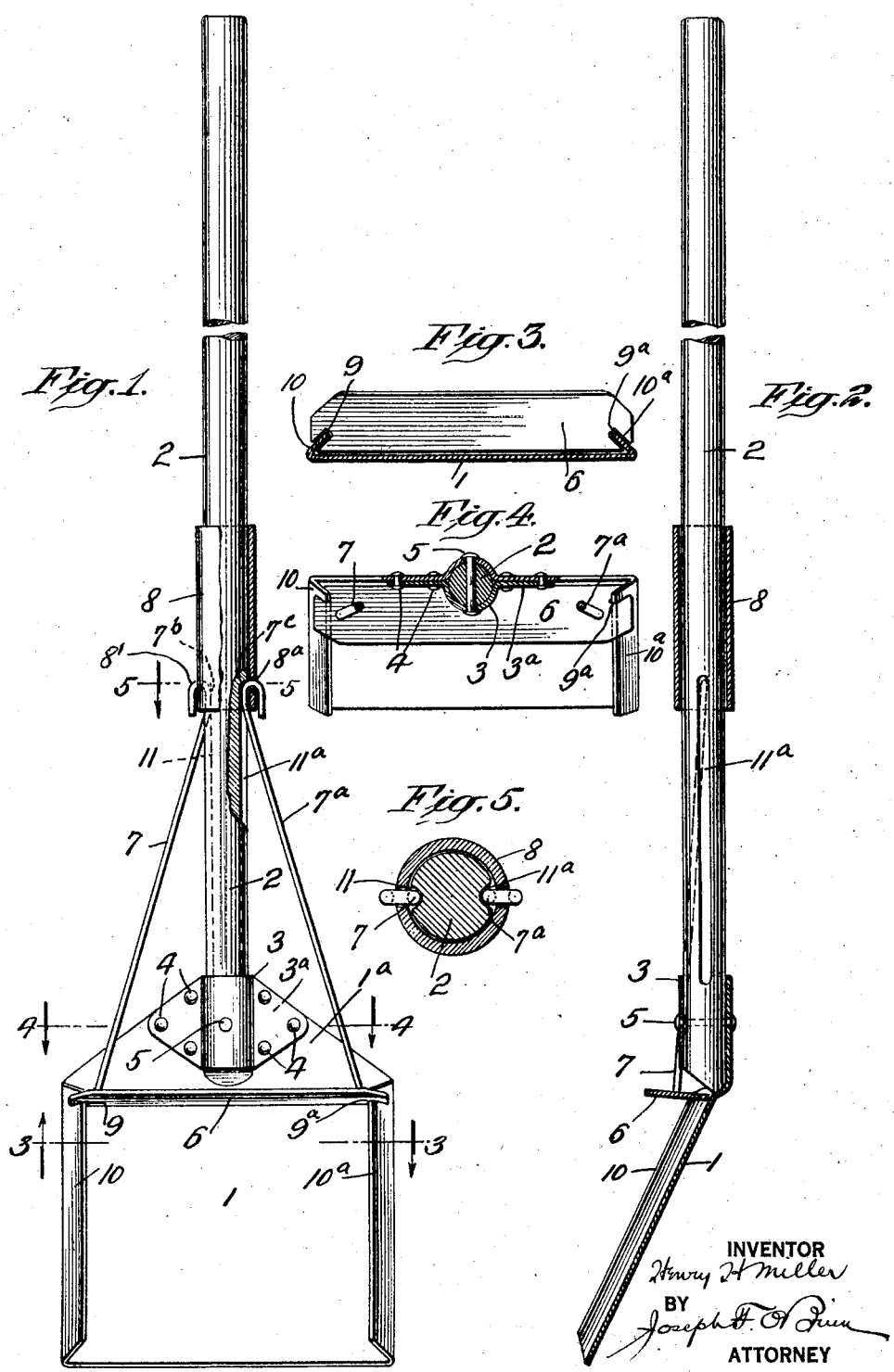

1,645,656

UNITED STATES PATENT OFFICE.

HENRY H. MILLER, OF RIVER EDGE, NEW JERSEY.

SHOVEL.

Application filed August 24, 1925. Serial No. 51,974.

This invention relates to improvements in shovels and the like.

The object of this invention is to produce a shovel in which the blade will be readily, quickly and easily cleansable.

Another object of the invention is to provide a shovel construction in which the cleaning element may be mounted in a very simple and inexpensive manner and in which the operating movement of the cleaning element to free the blade from the load will be in the same direction as the shovelling movement and may be easily actuated simultaneously therewith.

Another object of the invention is to provide a shovel of the type specified composed of simple parts which may be readily and quickly assembled and in which the cleaning element when not in use will not form an obstruction to ordinary use of the shovel but will form a back-stop for the material.

Another object is to provide simple means for operating the blade scraper or cleaning element on the handle of the shovel.

Another object is to provide simple means for guiding the operating means, and also simple means for guiding the blade scraper.

With these and other objects in view, the invention comprises the combination of members and arrangement of parts so combined as to co-act and cooperate with each other in the performance of the functions and accomplishment of the results herein contemplated, and comprises in one of its adaptations the species or preferred form illustrated in the accompanying drawings, in which:—

Fig. 1 is a front elevation of a shovel embodying my invention;

Fig. 2 is a longitudinal section of the shovel shown in Fig. 1;

Fig. 3 is a section on the line 3—3 of Fig. 1 looking in the direction of the arrow;

Fig. 4 is a section on the line 4—4 of Fig. 1 looking in the direction of the arrow; and Fig. 5 is a section on the line 5—5 of Fig. 1 looking in the direction of the arrow.

Referring now to these drawings, which illustrate a preferred embodiment of my invention, 1 indicates a blade, scoop or load carrying portion which is preferably composed, as shown, of sheet metal and is connected to a handle 2 to extend in an inclined plane therefrom. In the preferred embodiment, the handle comprises a cylindrical stick of wood mounted within a mounting sleeve or ferrule 3 which, as shown, is formed partly in an integral extension $1^a$ of the blade portion 1 and partly in a top plate $3^a$ riveted to the extension 1 by rivets 4. The end of the handle is also preferably separately connected with the blade portion by a rivet 5 passing through the wood of the handle and through the metal on opposite sides thereof.

Mounted to reciprocate longitudinally over the blade-portion 1 so as to clean the upper surface thereof during each downward movement is a blade-scraper 6. This downward movement of the scraper 6 is accomplished by the sliding movement along the handle 2 simultaneously with the shovelling movement of an operating member 8 preferably comprising a metallic sleeve or slide. As illustrated, the scraper 6 and operating sleeve 8 are connected by rods 7, $7^a$ having their lower ends securely fixed to said scraper and their upper ends connected to the metallic operating sleeve 8 which has a sliding fit upon the cylindrical shovel handle 2. The scraper 6 is preferably guided in its movement along the shovel by the provision therein of notches 9, $9^a$ which fit over or engage guiding members comprising flanges 10, $10^a$ preferably formed integrally with the blade of the shovel. As shown, the flanges 10 and $10^a$ comprise portions of the metal of the blade bent up to form integral guiding flanges.

The rods 7, $7^a$ are guided in their longitudinal reciprocation and outward-swinging movements by the provision in the periphery of the handle 2 at opposite sides of longitudinal grooves 11, $11^a$ which engage the upper hook-portions $7^b$, $7^c$ of the connecting rods 7, $7^a$ at the point of connection thereof with the operating sleeve. These hook portions $7^b$, $7^c$ extend through apertures 8′, $8^a$ in the operating sleeve which, as aforesaid, is mounted on the handle to slide up and down thereon while the hook-portions $7^b$, $7^c$ of the connecting rods fit into and slide along the grooves 11, $11^a$ respectively, at the same time turning in the grooves to permit the connecting rods to follow and reciprocate the scraper 6 along the inclined surface of the blade.

It will be seen that the scraper is rigidly and securely mounted on the blade 1 and is guided in its reciprocating movement along the blade; also that the operating sleeve is guided and prevented from turning in its reciprocating movement and that the connecting rods are similarly firmly mounted and guided in their reciprocating and swinging movements by the grooves 11, 11ª in the handle.

It will be seen, furthermore, that I have provided a very simple construction of shovel or scoop which is particularly adapted for use as a snow shovel or snow scoop, that the scraper may be reciprocated with great ease and facility and that it may be so reciprocated during load-discharging or throwing movement of the shovel. It will, furthermore, be apparent that the construction is so simple that it can be produced at a very low cost and that there are no parts to get out of order or that are likely to break or stick during use.

It will be seen, furthermore, that the flanges 10, 10ª of the blade portion not only act as guides for the scraper but also act as side strips to assist in strengthening the blade and to enable a bigger load to be piled up on the blade.

Having described my invention, I claim:—

1. A shovel comprising a handle portion and a blade connected thereto and extending at an angle from the axis thereof, a scraper mounted on the upper surface of the blade and reciprocable up and down along such surface, means on the blade for engaging and guiding the opposite edges of the scraper in its reciprocating movement, an operating sleeve mounted to slide on the handle, and connecting rods on opposite sides of said handle having a fixed connection with said scraper and a swinging connection with the operating sleeve.

2. A shovel comprising a handle portion and a blade connected thereto and extending at an angle from the axis thereof, a scraper mounted on the upper surface of the blade and reciprocable up and down along such surface, means on the blade for engaging and guiding the opposite edges of the scraper in its reciprocating movement, an operating sleeve mounted to slide on the handle, connecting rods on opposite sides of said handle having a fixed connection with said scraper and a swinging connection with the operating sleeve, said handle having at opposite sides peripheral grooves for guiding the upper ends of said connecting rods in the reciprocating and swinging movements thereof.

In witness whereof, I have signed my name to the foregoing specification.

HENRY H. MILLER.